United States Patent
Cheng et al.

(10) Patent No.: US 11,829,377 B2
(45) Date of Patent: Nov. 28, 2023

(54) EFFICIENT STORAGE METHOD FOR TIME SERIES DATA

(71) Applicant: TAOS DATA, Beijing (CN)

(72) Inventors: Hongze Cheng, Beijing (CN); Shengliang Guan, Beijing (CN); Haojun Liao, Beijing (CN); Jianhui Tao, Beijing (CN)

(73) Assignee: TAOS DATA, Beijing (CN)

( * ) Notice: Subject to any disclaimer, the term of this patent is extended or adjusted under 35 U.S.C. 154(b) by 82 days.

(21) Appl. No.: 17/265,281

(22) PCT Filed: Jul. 18, 2019

(86) PCT No.: PCT/CN2019/096451
§ 371 (c)(1),
(2) Date: Feb. 2, 2021

(87) PCT Pub. No.: WO2020/024798
PCT Pub. Date: Feb. 6, 2020

(65) Prior Publication Data
US 2021/0279240 A1  Sep. 9, 2021

(30) Foreign Application Priority Data
Aug. 3, 2018 (CN) .......................... 201810879112.7

(51) Int. Cl.
*G06F 16/2458* (2019.01)
*G06F 16/2457* (2019.01)
(Continued)

(52) U.S. Cl.
CPC ...... *G06F 16/2477* (2019.01); *G06F 11/3452* (2013.01); *G06F 16/2255* (2019.01);
(Continued)

(58) Field of Classification Search
CPC ............. G06F 16/2477; G06F 16/9537; G06F 16/24573; G06F 16/2255; G06F 16/25; G06F 11/3452; H04L 67/02
See application file for complete search history.

(56) References Cited

U.S. PATENT DOCUMENTS

| | | | |
|---|---|---|---|
| 10,353,590 B2* | 7/2019 | Cooke | G06F 11/3034 |
| 2011/0113339 A1* | 5/2011 | Lee | G06F 16/25 |
| | | | 707/769 |

(Continued)

FOREIGN PATENT DOCUMENTS

| | | |
|---|---|---|
| CN | 102033882 A | 4/2011 |
| CN | 106227794 A | 12/2016 |
| CN | 109165217 A | 1/2019 |

*Primary Examiner* — Albert M Phillips, III
(74) *Attorney, Agent, or Firm* — Greer, Burns & Crain, Ltd.

(57) ABSTRACT

The present invention discloses an efficient storage method for time-series data, comprising: storing time-series data collected by each data sampler and static attribute data of its data sampler separately; when each time series is stored, based on a unique ID of each time series, storing corresponding time-series data; and when the static attribute data is stored, the static attribute data are stored in another database independently, wherein each data sampler saves one corresponding record in a database storing the static attribute data. According to the present invention, the storage space can be saved, the processing efficiency and the processing speed can be improved, and the query processing can be flexibly carried out.

6 Claims, 1 Drawing Sheet

(51) Int. Cl.
*G06F 16/22* (2019.01)
*G06F 16/25* (2019.01)
*G06F 11/34* (2006.01)
*H04L 67/02* (2022.01)
*G06F 16/9537* (2019.01)

(52) U.S. Cl.
CPC ........ *G06F 16/24573* (2019.01); *G06F 16/25* (2019.01); *H04L 67/02* (2013.01); *G06F 16/9537* (2019.01)

(56) References Cited

U.S. PATENT DOCUMENTS

| | | |
|---|---|---|
| 2013/0006982 A1 | 1/2013 | Sun |
| 2013/0103657 A1* | 4/2013 | Ikawa ................. G06F 16/2477 707/693 |
| 2013/0238619 A1* | 9/2013 | Hanaoka ............... G06F 16/245 707/769 |
| 2016/0147830 A1* | 5/2016 | Zhong ............... G06F 16/24565 707/769 |
| 2017/0017698 A1 | 1/2017 | Bullotta et al. |
| 2018/0232459 A1* | 8/2018 | Park ................... G06F 16/2477 |
| 2018/0246950 A1* | 8/2018 | Arye ..................... G06F 16/278 |
| 2019/0306242 A1* | 10/2019 | Thummalapalli ... H04L 41/0806 |
| 2019/0334698 A1* | 10/2019 | Singh ................. G06Q 20/3829 |

\* cited by examiner

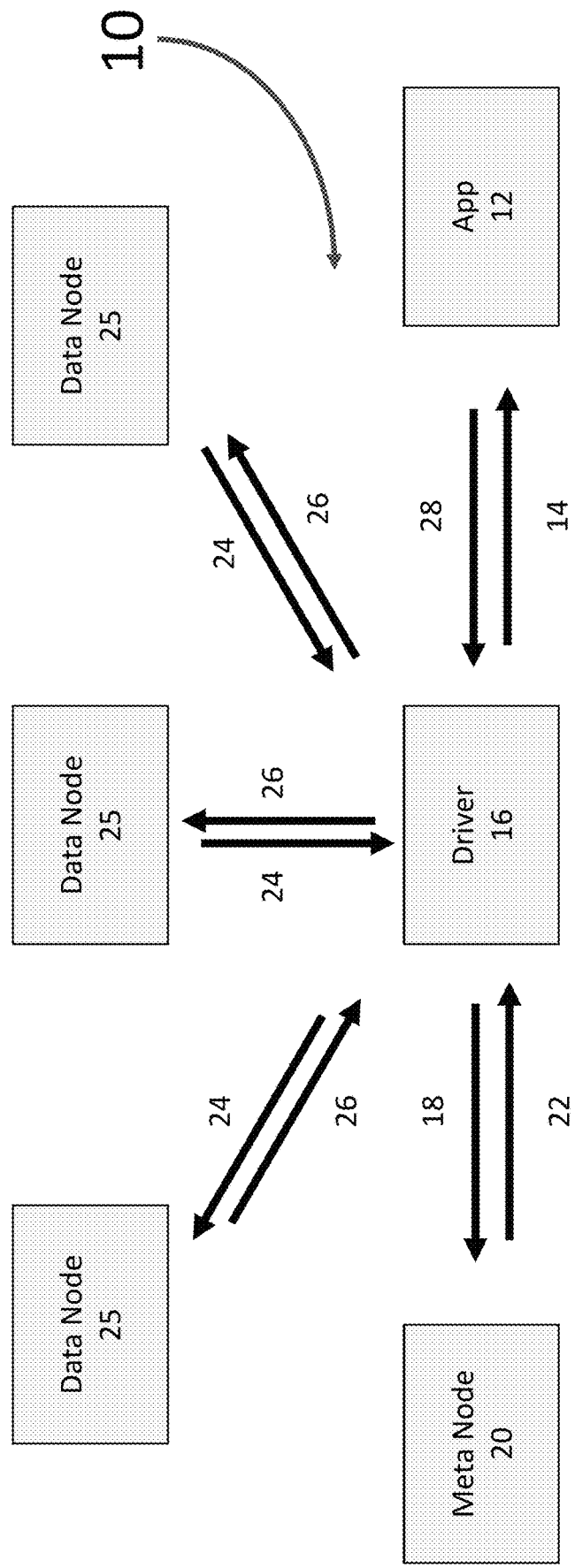

EFFICIENT STORAGE METHOD FOR TIME SERIES DATA

CROSS-REFERENCE TO RELATED APPLICATIONS

This application is a U.S. national stage application of PCT/CN2019/096451 filed Jul. 18, 2019 which claims the benefit of priority to Chinese Patent Application CN 201810879112.7 filed Aug. 3, 2018, the entire disclosures of which are incorporated herein by reference.

TECHNICAL FIELD

The invention relates to the field of data processing, specifically to an efficient storage method for time-series data

BACKGROUND ART

Time-series data refers to time series data, which is a data column recorded in chronological order. One time series of data is typically generated by one data sampler (a sensor or a device), which often has various attributes, such as device serial number, manufacturer, model number, geographic location, etc., belonging to static information.

In actual scenarios, there are often multiple devices of the same type. and the time series data generated by them needs to be aggregated and calculated based on various attributes. For example, to calculate the average value of Beijing's PM2.5, you need to add up the values of each PM2.5 data sampler in Beijing to average. While to calculate the average value of PM2.5 in Chaoyang District, you only need to add up the values of each PM2.5 data ampler in Chaoyang District to average.

A general time-series data processing method is to store the attributes of the collection points as tags while recording the collection volume. However, this design presents two problems: the data redundancy is serious because each record is provided with a tag; in addition, the tag information modification of the historical data is very difficult, resulting in insufficient flexibility of the query.

SUMMARY OF THE INVENTION

The invention aims to overcome the defects in the prior art, and provides an efficient storage method for time-series data, which can save storage space, improve processing efficiency greatly and improve processing speed and is flexible in query processing.

The invention provides an efficient storage method for time-series data, comprising the following steps:
  storing time-series data collected by each data sampler and static attribute data of its data sampler separately;
  wherein when each time series is stored, based on a unique ID of each time series, storing corresponding time-series data; and
  wherein when the static attribute data is stored, the static attribute data are stored in another database independently, wherein each data sampler saves one corresponding record in a database storing the static attribute data.

Further, the corresponding time-series data is stored by establishing an independent table, and the ID is used as a key value of the table.

Further, a node of the corresponding time-series data are stored by a data node.

Further, the static attribute are stored by metadata node.

Further, a database of the metadata node has one row of records for each data sampler.

Further, each row of records comprises a static attribute data of data sampler and information of data node corresponding to that data sampler.

Further, the static attribute data of the metadata node can be added, deleted and/or modified to support a query of various combination conditions.

Further, when data is stored, a corresponding metadata node is accessed according to the data sampler ID to obtain corresponding data node information, or the data node information is directly predicted according to the Hash algorithm, so that collected time-series data is written into a corresponding data node.

Further, the method further comprising steps of aggregate query and calculation, specifically as follows:
  1) an application calls a system API to provide query condition;
  2) a Driver sends the query condition to a metadata node;
  3) the metadata node filters data samplers meeting the condition according to the query condition, and returns a data sampler ID and a corresponding data node information list to the Driver;
  4) the Driver sends aggregation and calculation request to one or more data nodes, wherein the request comprises data sampler ID saved on one or more data node; the data node processes the time-series data of a data sampler to be processed, performs a first-step aggregation, and returns a result to the Driver; and
  6) after the Driver receives a returned result from each data node, a second-step aggregation operation is performed, and the result is returned to the application.

Further, one SDK is provided by the Driver for a system, the SDK is compiled with an application program, and for RESTful interface, the Driver is one interface of the whole system for external service, and receives and processes HTTP requests.

The time-series data processing method provided by the present invention can realize effects as follows:
  1) the data node does not save static attribute data (tag information), and the static attribute data of each data sampler has only one row of records on the metadata node so that the storage space is greatly saved;
  2) the metadata node firstly filters out the list of the data samplers to be processed according to the query condition such that the data scanning on the data node can be greatly saved, the data that needs to be processed can be accurately located, and the processing speed is greatly improved;
  3) each data node is aggregated firstly, then the Driver performs the final aggregation, wherein the design of the two-step aggregation greatly reduces the communication between the data node and the Driver and the overall processing efficiency is greatly improved;
  4) the static attribute data is independently stored and can be added, deleted, and modified as needed so that various flexible query conditions can be supported. For the stored historical time-series data, there is no need to modify any data on the data node, as long as the label information on the metadata node is modified, new analysis and calculations can be performed.

BRIEF DESCRIPTION OF THE DRAWINGS

FIGURE is a schematic flow diagram of an efficient storage method for time-series data.

DETAILED DESCRIPTION OF THE INVENTION

While specific implementations of the present invention will be described in detail below, it is necessary to point out that the following implementations are only used for further explanation of the present invention and cannot be understood as a limitation of the protection scope of the present invention. Some non-essential improvements and adjustments made to the present invention by those skilled in the art based on the above content of the present invention still belong to the protection scope of the present invention.

The invention provides an efficient storage method for time-series data, which is specifically introduced below.

(1) Establishing a Time-Series Data Model storing and processing time-series data collected by each data sampler and static attribute data (tag information) of its data sampler separately.

There may be multiple tables for storing static attributes. One table is used for data sampler of the same type, and a different attribute table is used for data sampler of different types. The static attribute definition of each type of data sampler is different.

When each time series is stored, based on a unique ID of each time series, storing corresponding time-series data We refer to the node storing the data as a data node.

The static attribute data (tag information) for each data sampler is held separately in one table, with each data sampler having one row of records in the table. If there are 1 million data samplers, there are 1 million rows of records. In addition to the static attribute data, each row of records also records information (such as IP address) of the data node corresponding to the data sampler. The node storing the table is referred to as a metadata node. The static attribute data of the metadata node can be added, deleted, and modified and can support queries with various combination conditions.

Therefore, the data node does not save tag data, the tag data for each data sampler has only one row of records on the metadata node, and the storage space is greatly spared.

(2) Write Data Procedure when data is stored, a corresponding metadata node is accessed according to the data sampler ID to obtain corresponding data node information, or the data node information is directly predicted according to the Hash algorithm, so that collected time-series data is written into a corresponding data node. The written time-series data does not have any static attribute or tag information, and only has time-series data.

(3) With reference to FIGURE, Aggregate query and calculation procedure, generally 10, will now be described.

When performing aggregation queries or calculations, the application needs to provide query conditions. In addition to time conditions, these conditions often have filter conditions based on static attributes, such as geographic location, model, color, etc. The specific procedure, generally is as follows:

1. the application (12) calls (14) the API provided by a system, or sends an HTTP requests to the system to provide the query conditions of the application;
2. the Driver (16) sends the query condition (18) to the metadata node (20);
3. the metadata node (20) filters out the data sampler meeting the conditions according to the query conditions, and returns (22)—the ID of the data samplers and the corresponding data node information list to the Driver (16) so that by firstly filtering out the list of the data samplers to be processed, the data scanning on the data node can be greatly saved, the data that needs to be processed can be accurately located, and the processing speed is greatly improved;
4. the Driver (16) sends (24) aggregation and calculation request to one or more data nodes (25), wherein the request comprises one or more data sampler ID located on the data node;
5. the data node (25) processes the time-series data of a data sampler to be processed, such as sum, avg operations, performs a first-step aggregation, and returns (26) a result to a Driver (16);
6. after the Driver (16) receives the return result from each data node, a second-step aggregation operation is performed, and then the result is returned (28) to the application (APP) (12), so that each data node is aggregated firstly, then the Driver performs the final aggregation with the communication between the data node and the Driver being greatly reduced and the overall processing efficiency being greatly improved.

It should be noted that the Driver can be in two forms.

1) An SDK provided by the system is compiled with the application, and the application uses the API to call the functions provided by the Driver. Access to metadata nodes, data nodes and the second stage of aggregation are actually executed on the computer where the APP is running. 2) Applications can use Restful API to access a module of external services of the entire system. In this case, access to metadata nodes, data nodes, and second-stage aggregation are all performed inside the system. In the above method, the static attribute data is independently stored and can be added, deleted, and modified as needed, so that various flexible query conditions can be supported. For the stored historical time-series data, new analysis and calculation can be carried out as long as the static attribute data on the metadata node is modified and there is no need for any data on the data node to be modified. Although the exemplary implementations of the present invention have been described for illustrative purposes, those skilled in the art will understand that various modifications, additions, and substitutions, and like changes can be made in form and details without departing from the scope and spirit of the invention disclosed in the appended claims. All these changes shall fall within the protection scope of the appended claims of the present invention. Various steps in various departments and methods of the products claimed by the present invention can be combined in any combination. Therefore, the description of the implementations disclosed in the present invention is not intended to limit the scope of the present invention, but is used to describe the invention. Accordingly, the scope of the present invention is not limited by the above implementations, but is defined by the claims or the equivalents thereof.

The invention claimed is:

1. A method of processing time-series data, comprising the following steps:

sending, by a driver, each time-series data collected by a data sampler to a data node corresponding to the data sampler;

storing, by the data node the each time series data collected by the data sampler into a time-series data table, in the data node based on a unique ID of each time-series to establish a time-series data query database without the static attribute data of the data sampler;

storing, by a metadata node, the static attribute data of the data sampler containing a data sampler ID and information of the data node corresponding to the data sampler into a static attribute data table wherein the static attribute data table has one row of records containing the static attribute data of the data sampler and the information of the data node corresponding to the data sampler such that the metadata node can return the data sampler ID meeting a query condition and corresponding the information of the data node to the driver according to the query conditions from the driver; and wherein when the static attribute data of the data sampler changes, the metadata node modifies the static attribute data of the data sampler in the one row of records in the static attribute data table or adds a new static attribute data of the data sampler in the one row of records in the static attribute data table to support a query of various combinations of conditions.

2. The method of claim 1, wherein the metadata node can also delete the static attribute data of the data sampler.

3. The method of claim 1, wherein when the time-series data is stored, the method further comprises:

accessing a corresponding metadata node according to the data sampler ID to obtain corresponding data node information, or predicting the data node information according to the Hash algorithm, and thereby writing the each collected time-series data into the corresponding data node.

4. The method of claim 1, wherein further comprising steps of aggregate query and calculation, specifically as follows:
1) an application calls a system API to provide query condition;
2) a driver sends the query condition to a metadata node;
3) the metadata node filters data samplers meeting the condition according to the query condition, and returns the data sampler ID and a corresponding data node information list to the driver;
4) the driver sends aggregation and calculation request to one or more data nodes, wherein the request comprises the data sampler ID saved on one or more data node;
5) the data node processes the time-series data of a data sampler to be processed, performs a first-step aggregation, and returns a result to the driver; and
6) after the driver receives a returned result from each data node, a second-step aggregation operation is performed, and the result is returned to the application.

5. The method of claim 4, wherein one SDK is provided by the driver for a system, the SDK is compiled with an application program, and for RESTful interface, the driver is one interface of the whole system for external service, and receives and processes HTTP requests.

6. The method of claim 1, wherein the corresponding time-series data is stored by establishing the time-series table, and the unique ID of each time-series is used as a key value of the time-series table.

* * * * *